United States Patent

Hill

[15] 3,689,883
[45] Sept. 5, 1972

[54] LIQUID LEVEL DETECTOR

[72] Inventor: William Frank Hill, Stafford, England

[73] Assignee: Joseph Lucas (Industries) Limited, Birmingham, England

[22] Filed: Aug. 14, 1970

[21] Appl. No.: 63,785

[52] U.S. Cl. .................... 340/59, 73/304, 307/10 R, 307/118, 340/244 C
[51] Int. Cl. ........................ B60q 1/00, G01f 23/24
[58] Field of Search .......... 340/59, 244 C; 73/304 R; 307/10 R, 118; 331/64, 65, 108 R

[56] References Cited

UNITED STATES PATENTS

| | | | |
|---|---|---|---|
| 3,291,149 | 12/1966 | Atkins et al. | 340/244 C |
| 2,648,058 | 8/1953 | Breedlove | 73/304 R |
| 3,341,836 | 9/1967 | Marcum | 340/244 C |
| 3,503,007 | 3/1970 | Kutschback | 331/65 |

OTHER PUBLICATIONS

Gosling, William, Field Effect Transistor Applications, pp. 92–93, John Wiley & Sons, Inc., New York, 1965. TK7872T73G67.

Primary Examiner—John W. Caldwell
Assistant Examiner—Glen R. Swann, III
Attorney—Holman and Stern

[57] ABSTRACT

A liquid level detection circuit for use in a road vehicle has an oscillator which functions with a plurality of separate liquid containers, each incorporating a probe immersed in the liquid, the level in any of the containers of which is to be detected. When the liquid level falls below a predetermined level, the resistance of the probe changes with a result that the oscillator ceases to operate. A warning device is employed which is held inoperative only when the oscillator is operating.

5 Claims, 2 Drawing Figures

LIQUID LEVEL DETECTOR

BACKGROUND AND FIELD OF THE INVENTION

This invention relates to liquid level detection circuits, particularly for use in road vehicles.

A circuit according to the invention comprises in combination an oscillator incorporating a probe immersed in the liquid the level of which is to be detected, a fall in liquid level below a predetermined position resulting in a change in resistance of the probe, with the result that the oscillator ceases to operate, and a warning device which is held inoperative when the oscillator is operating.

BRIEF DESCRIPTION OF THE DRAWINGS

In the accompanying drawings.

DESCRIPTION OF PREFERRED EMBODIMENTS

Figure 1:
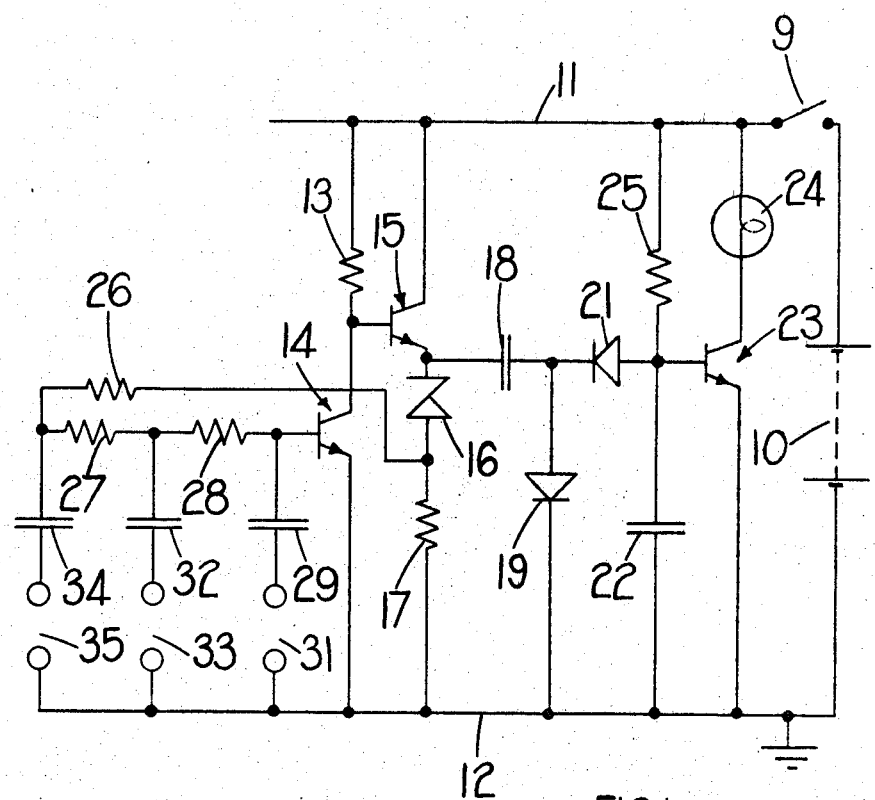
FIGS. 1 and 2 are circuit diagrams illustrating two examples of the invention as applied to a liquid level detection circuit in a road vehicle.

Referring to FIG. 1, there is provided positive and negative supply lines 11, 12 which are energized by the vehicle battery 10 under the control of the ignition switch 9. The negative line is conveniently earthed. Connected through a resistor 13 to the line 11 is the collector of an n-p-n transistor 14 the emitter of which is connected to the line 12, and the collector of which is further connected to the base of an n-p-n transistor 15 having its collector connected to the line 11 and its emitter connected to the line 12 through a Zener diode 16 and a resistor 17 in series. The emitter of the transistor 15 is further connected to the line 12 through a capacitor 18 in series with a diode 19, the junction of the capacitor 18 and diode 19 being connected to the line 12 through a diode 21 and capacitor 22 in series. The junction of the diode 21 and capacitor 22 is connected to the base of an n-p-n transistor 23 having its emitter connected to the line 12, its collector connected to the line 11 through a lamp 24 and its base connected to the line 11 through a resistor 25.

The junction of the Zener diode 16 and resistor 17 is connected to the base of the transistor 14 through resistors 26, 27 and 28 in series. The base of the transistor 14 is connected to the line 12 through a capacitor 29 and a probe 31 in series, the junction of resistors 27 and 28 is connected to the line 12 through a capacitor 32 and probe 33 in series, and the junction of resistor 26 and 27 is connected to the line 12 through a capacitor 34 and probe 35 in series.

The circuit monitors the liquid levels in three different containers, for example, the radiator of the vehicle, the clutch fluid container and the brake fluid container. When all these containers are filled above a predetermined level, the resistances of the probes 31, 33 and 35 are low, and the transistors 14 and 15 and their associated components constitute an oscillator in which positive pulses pass through the capacitor 18 and diode 19 to earth, and negative pulses charge the capacitor 22 by way of the diode 21. The Zener diode 16 provides the required bias in the oscillator. As long as the oscillator is oscillating, the voltage across the capacitor 22 ensures that the base of the transistor 23 is negative with respect to its emitter, so that the transistor 23 is off and the lamp 24 is extinguished.

However, if the liquid level in any one of the containers falls below the predetermined level, then one of the probes 31, 33 or 35 will have an increased resistance, which will change the phase of the input signal to the base of the transistor 14, with the result that the oscillator will stop oscillating. By virtue of the voltage drop across the diodes 21 and 19, the base of the transistor 23 will now be positive with respect to its emitter, so that the transistor 23 conducts and the warning lamp 24 is illuminated. When the liquid is replenished in the appropriate container, the oscillator starts working again, and the transistor 23 is turned off.

Figure 2:
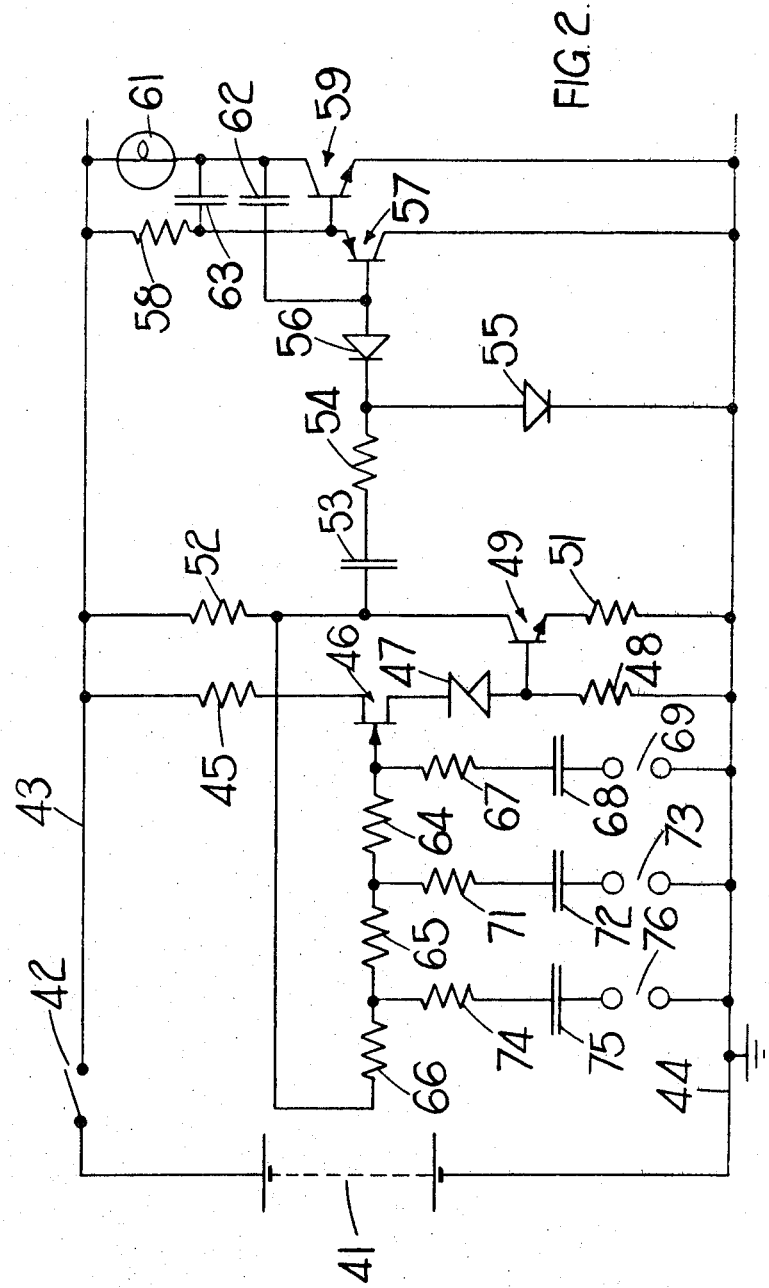

Turning now to the example shown in FIG. 2, the battery 41 of the vehicle has its positive terminal connected through the ignition switch 42 to a supply line 43, and its negative terminal connected to a supply line 44. The line 43 is connected through a resistor 45 to the source of field effect transistor 46, the drain of which is connected through a Zener diode 47 and a resistor 48 in series to the line 44. The junction of the Zener diode 47 and resistor 48 is connected to the base of an n-p-n transistor 49 having its emitter connected to the line 44 through a resistor 51, and its collector connected through a resistor 52 to the line 43. The collector of the transistor 49 is further connected to the line 44 through a series circuit including a capacitor 53, a resistor 54 and a diode 55, the junction of the resistor 54 and diode 55 being connected through a diode 56 to the base of a p-n-p transistor 57 having its collector connected to the line 44 and its emitter connected through a resistor 58 to the line 43. The emitter of the transistor 57 is further connected to the base of an n-p-n transistor 59, the emitter of which is connected to the line 44 and the collector of which is connected through a warning lamp 61 to the line 43. The collector of the transistor 59 is further connected through a capacitor 62 to the base of the transistor 57, and through a capacitor 63 to the emitter of the transistor 57.

The gate of the transistor 46 is connected through resistors 64, 65 and 66 in series to the collector of the transistor 49, and is further connected to the line 44 through a series circuit including a resistor 67, a capacitor 68 and a probe 69. The junction of the resistors 64 and 65 is connected to the line 44 through another series circuit including a resistor 71, a capacitor 72 and a second probe 73, whilst the junction of resistors 65 and 66 is connected to the line 44 through a series circuit including a resistor 74, a capacitor 75 and a probe 76.

As in the first example, the circuit monitors the liquid levels in three different containers. The transistors 46 and 49 form an oscillator as in the first example, but the use of the field effect transistor 46 enables probes to be used having much higher impedances than in the first example. The resistors 67, 71 and 74 are incorporated to prevent the circuit from oscillating at a higher frequency than desired as a result of any probe capacitance that may be present.

As long as the oscillator is operating, charging and discharging of the capacitor 53 holds the transistor 57 on, so that no base current flows to the transistor 59 and the warning lamp 61 is extinguished. However, if the oscillator ceases to operate as a result of the liquid in one of the containers falling below the predetermined level, then the transistor 57 turns off, and current flows through the resistor 58 turns on the transistor 59 to illuminate the lamp 61.

An advantage of the arrangement described is that when the switch 42 is first closed, the transistor 59 will conduct until the capacitor 62 has charged, so indicating that the lamp 61 is operating satisfactorily. The purpose of the capacitor 63 is to provide negative feedback which overcomes any tendency for the feedback supplied by the capacitor 62 to cause oscillations of the network 57, 59.

I claim:

1. A liquid level detector for detecting liquid level in a plurality of independent containers and actuating a warning device if the liquid level in any of the containers falls below a predetermined level, comprising in combination: a plurality of liquid level probe means each disposed in one of said containers and displaying an increased electrical resistance if the liquid level in a respective container falls below a predetermined level; an oscillator means having a control input and an output; connecting means to connect said plurality of liquid level probes in parallel to said control input of said oscillator means; a warning device to indicate a low liquid level in any of said containers; a semiconducting device connected to said warning device and a power source, and having a control input point; and means connecting said control input point of said semiconducting device to the output of said oscillator means, whereby said oscillator means is maintained operative normally and said warning device is not actuated, but, upon the liquid in any of said plurality of containers falling below a predetermined level, a changed control voltage from a corresponding probe is supplied to said oscillator to interrupt the functioning thereof so that said semiconducting device is rendered conductive to actuate said warning device to indicate a low liquid level in one of said containers.

2. The liquid level detector as claimed in claim 1 in which said semiconducting device is a transistor with its emitter connected to one terminal of the power source, its collector connected through said warning device to the other terminal of the power source and wherein only pulses of a selected polarity from the output of said oscillator means are applied to the base of said transistor through a diode circuit.

3. The liquid level detector as claimed in claim 1 in which said semiconducting device is a transistor with its emitter connected to a positive terminal of said power source and its collector connected to the negative terminal of said power source through said warning device, and, negative pulses of the output of said oscillator means are connected to the base of said transistor through a diode circuit, the detector including a capacitor connected between the base of the transistor and the negative terminal of the power source so as to be charged with a negative potential to maintain the base of said transistor negative with respect to its emitter thereby rendering the transistor nonconductive when the oscillator is functioning.

4. The liquid level detector as claimed in claim 3 which includes a capacitance connected in series with each of said plurality of liquid level probe means.

5. The liquid level detector as claimed in claim 3 wherein resistances are included in said connecting means which connect said plurality of liquid level probe means.

* * * * *